(No Model.)
2 Sheets—Sheet 1.
G. A. BOYDEN.
FLUID PRESSURE CAR BRAKE.
No. 356,057. Patented Jan. 11, 1887.
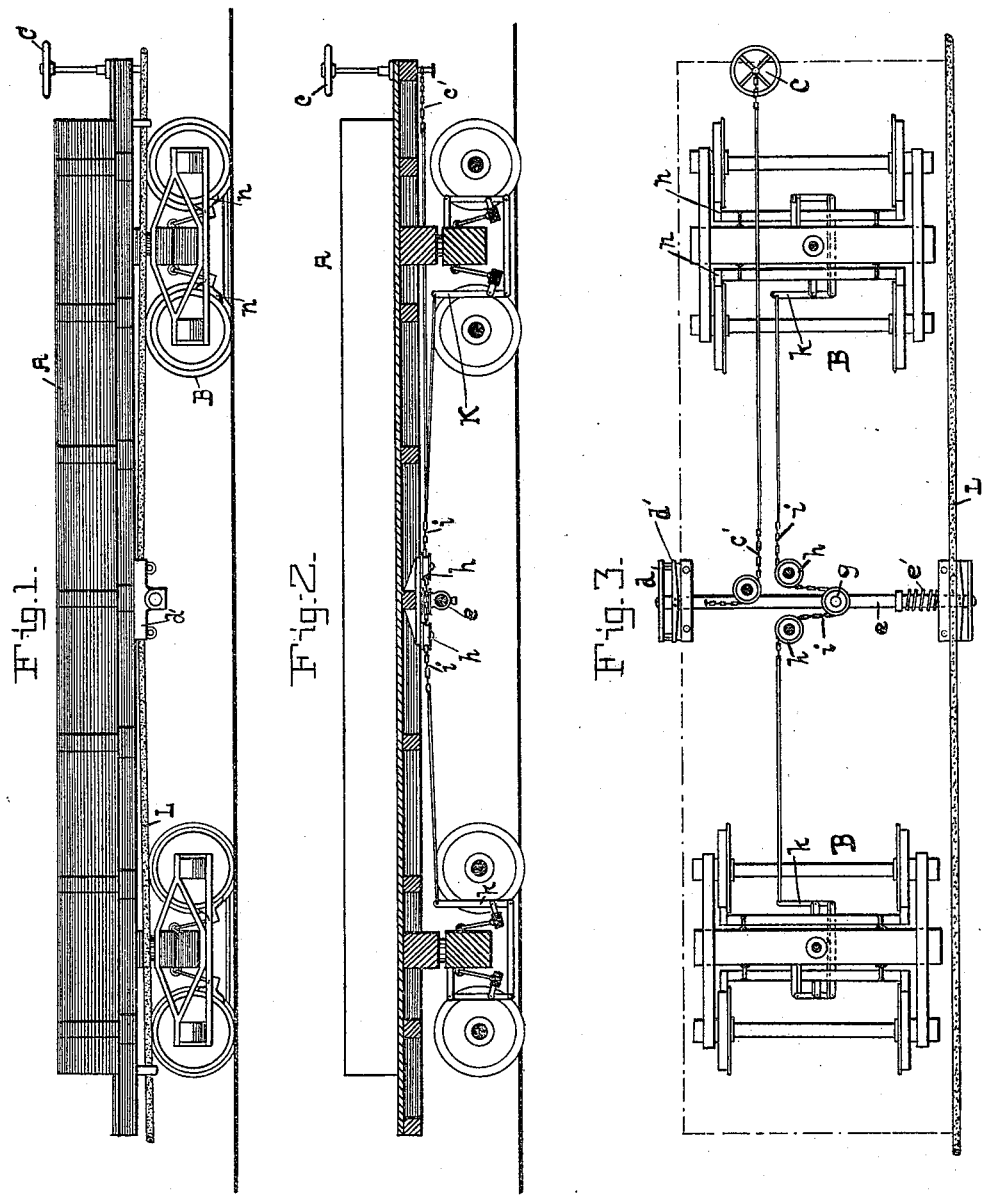
Witnesses:
Ben. F. Boyden.
John E. Morris.
Inventor:
Geo. A. Boyden,

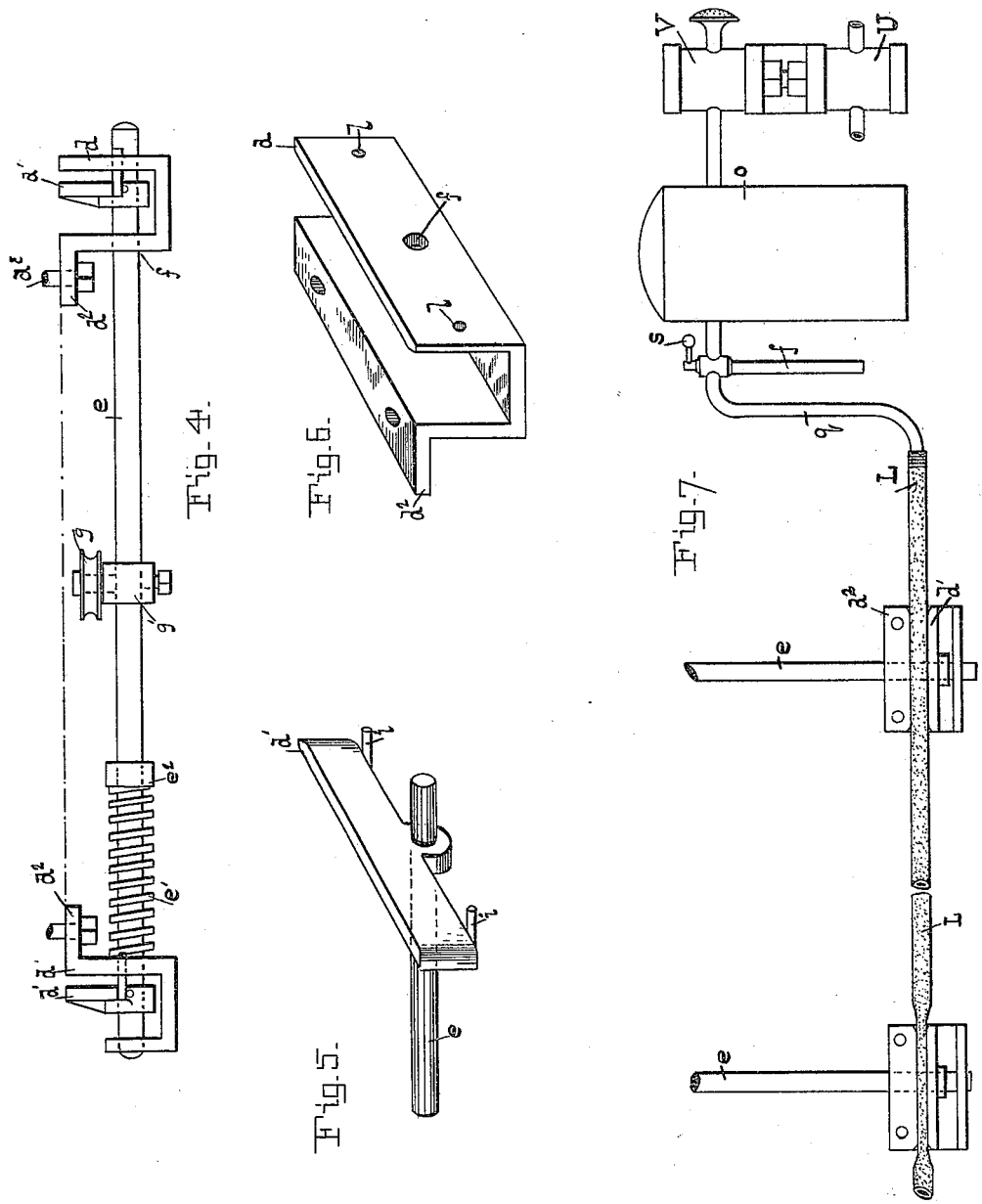

United States Patent Office.

GEORGE A. BOYDEN, OF BALTIMORE, MARYLAND, ASSIGNOR OF ONE-HALF TO CHARLES B. MANN, OF SAME PLACE.

FLUID-PRESSURE CAR-BRAKE.

SPECIFICATION forming part of Letters Patent No. 356,057, dated January 11, 1887.

Application filed June 22, 1886. Serial No. 205,865. (No model.)

*To all whom it may concern:*

Be it known that I, GEORGE A. BOYDEN, a citizen of the United States, residing at Baltimore, in the State of Maryland, have invented certain new and useful Improvements in Fluid-Pressure Car-Brakes, of which the following is a specification.

This invention relates to special mechanism for car-brakes of that class in which the agent for communicating the power is fluid under pressure.

The object of the invention is to provide special mechanism for connection with the ordinary brake mechanism on the truck, whereby the action of a collapsible and expansible train-pipe may be availed of to operate the said "ordinary brake mechanism," which term includes brake-shoes, beams, and levers.

The collapsible and expansible train-pipe herein shown is also shown, described, and claimed in my application for patent filed April 12, 1886, Serial No. 198,545.

The present invention is illustrated in the accompanying drawings, in which—

Figure 1 is a side view of a car equipped with my improvements. Fig. 2 is a vertical longitudinal section of the equipped car. Fig. 3 is a top view of the trucks and brake mechanism of a car without the car-body, and showing the collapsible and expansible train-pipe. Fig. 4 is a view, larger scale, of the train-pipe gripper and rod. Figs. 5 and 6 are perspective views of parts of the gripper. Fig. 7 is a view showing two grippers and the train-pipe. In one gripper the train-pipe is collapsed, and in the other it is expanded; and also shows a source of supply of fluid-pressure.

Referring to the drawings, the letter A designates a car; B, the trucks of the car equipped with ordinary brake mechanism—to wit, brake-shoes $n$, beams, and brake-lever $k$—and also the hand-wheel C on the upright shaft.

The action of a collapsible and expansible train-pipe or hose, L, is to be utilized in operating the above-named ordinary brake mechanism. The collapsed condition of the train-pipe is shown in the gripper $d\ d'$ at the left of Fig. 7. This condition is produced by a withdrawal or exhaustion of fluid-pressure from the train-pipe. The expanded condition of the train-pipe is shown in the right-hand gripper $d\ d'$ of Fig. 7. This condition is produced by the fluid-pressure, the fluid—such as water, oil, steam, or air—being in and throughout the pipe.

The invention which forms the subject of this patent is the herein-described mechanism, which enables the collapsible and expansible action, as aforesaid, of the train-pipe to be availed of.

A gripper for the train-pipe or hose L consists of two jaws, $d\ d'$, one of which, $d$, is stationary and the other, $d'$, movable. One jaw, $d$, has a flange, $d^2$, by which it is rigidly fixed to the car by bolts $d^3$ passing through the said flange into the car-frame. The movable jaw $d'$ is attached to a rod, $e$, which is supported below the car-body in bearings $f$, and said rod extends in a direction crosswise of the car-body. This rod carrying the jaw $d'$ has movement in its bearings. A pulley, $g$, is mounted on the said rod. This pulley, as here shown, turns on a pivot fixed to a collar, $g'$, which is adjustable on the rod. A spring, $e'$, surrounds the rod and is compressed between one of the fixed jaws $d$ and a collar, $e^2$, on the rod. This spring moves the rod $e$ endwise, and thereby brings the movable jaw $d'$ toward the stationary jaw, at which time the train-pipe is collapsed. The construction here is such that in this (closed) position of the jaws the brake-shoes $n$ are held off. Two other pulleys, $h$, each turn on a pivot which is fixed to and below the car-body, and each is at an opposite side of the rod $e$. A chain, $i$, passes on one side of the rod-pulley $g$ and on the opposite side of the two fixed pulleys $h$ and connects with the brake-lever $k$ on the car-trucks B. In the present instance both trucks are equipped with brakes, but the mechanism operates equally well if only one truck is equipped.

The hand-wheel C operates the ordinary brake mechanism on the trucks by means of a chain, C', which has one end attached to the rod $e$.

It will be seen that when the train-pipe expands the gripper-jaws will be forced apart, all of the expansion of the train-pipe taking effect on the movable jaw, and thereby the rod $e$ is moved endwise, which will cause a pull on the chain $i$ and levers $k$, whereupon the brake-shoes n will be applied to the wheels. This mechanism and the collapsible and expansible train-pipe may be used, as above described, to apply the brakes by the expansion of the train-pipe, which is direct action, or, reversely, the expansion may serve to hold the brakes off, while the spring e' applies the brakes. This latter may be termed "automatic action."

Referring again to the rod and gripper, it will be seen by reference to Figs. 3 and 4 that the rod e carries two gripper-jaws, d', one at each end. The car-body also has at each side a stationary gripper-jaw, d. The stationary jaw d on one side of the car-body is the outermost jaw of the gripper, and on the other side it is the innermost jaw of the gripper. By this arrangement the stationary jaw on one side co-operates with a movable jaw in a reverse or opposite manner from the stationary jaw on the other side of the car-body, whereby a movement of the rod e will have the same effect on the gripper at each and both sides of the car-body.

The train-pipe hose L extends along the train of cars at one side only, and the above-described arrangement and combination of two grippers, one at each side of the car-body, provides for a proper connection with the train-pipe, whichever side of the car happens to be next thereto.

Each stationary jaw has two holes, l, and each movable jaw has two pins, l', which occupy the said holes. In practice the length of the gripper-jaws d d' determines the pressure that will be exerted by the expansion of the train-pipe L. Whatever fluid-pressure there may be in the train-pipe, that which will be exerted on the rod e will be more or less, according as the gripper-jaws are longer or shorter. As will be readily perceived, the shape and construction of these jaws may be varied or changed from that here shown without departing from the essence of my invention.

Fig. 7 illustrates a source of supply of fluid-pressure. A tank, O, is for compressed air which is to enter the train-pipe L. A pipe, q, connects the tank with the train-pipe, and a three-way cock, s, controls the passage of the air-under pressure to the train-pipe. An exhaust-pipe, t, connected with the three-way cock, provides for the release of the pressure from the train-pipe. A steam-cylinder, U, and a condensing-pump, V, of usual construction, are employed to compress the air.

Having described my invention, I claim and desire to secure by Letters Patent of the United States—

1. The combination, with a collapsible and expansible train-pipe, L, through which fluid-under pressure passes, of ordinary brake mechanism on the car, and a gripper having a stationary jaw, d, and a movable jaw, d', which latter is connected with said brake mechanism, for the purpose specified.

2. The combination of ordinary brake mechanism, a gripper having a stationary jaw and a movable jaw, a rod, e, attached to the said movable jaw and carrying a pulley, g, a pulley, h, turning on a fixed pivot at one side of the said rod, and a chain passed on one side of the rod-pulley and on the opposite side of the fixed pulley, and connected with the brake mechanism, as set forth.

3. The combination of ordinary brake mechanism, a gripper having a stationary jaw and a movable jaw, a rod, e, attached to the said movable jaw and connected with the brake mechanism, a hand-wheel, C, on a shaft, and a chain, C', connecting the said shaft with the jaw-rod e, for the purpose specified.

4. The combination, with a collapsible and expansible train-pipe, L, through which fluid under pressure passes, of ordinary brake mechanism on the car, and two grippers, one at each side of the car-body, connected together, and also connected with said brake mechanism, substantially as described, whereby a proper connection may be made with the said train-pipe, whichever side of the car happens to be next thereto.

In testimony whereof I affix my signature in the presence of two witnesses.

GEORGE A. BOYDEN.

Witnesses:
JOHN E. MORRIS,
JNO. T. MADDOX.